Z. LOCKWOOD.
Improvement in Sash-Holders.
No. 129,149.
Patented July 16, 1872.
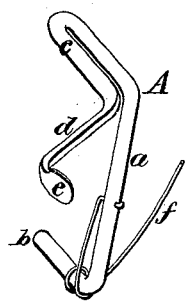
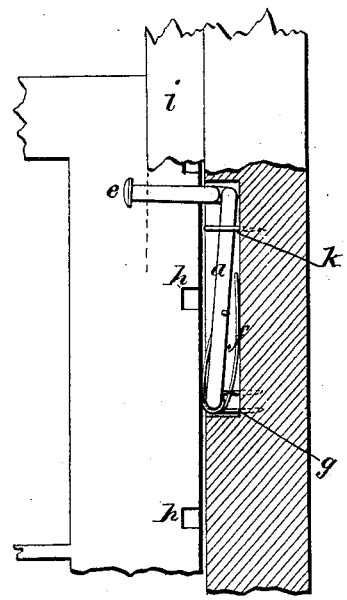
Witnesses.
Harry King.
Phil. T. Dodge.
Inventor.
Z. Lockwood
by Dodge & Munn
his attys.

UNITED STATES PATENT OFFICE.

ZEPHANIAH LOCKWOOD, OF SARATOGA SPRINGS, NEW YORK, ASSIGNOR TO HIMSELF AND JOHN OBER, OF SAME PLACE.

IMPROVEMENT IN SASH-HOLDERS.

Specification forming part of Letters Patent No. 129,149, dated July 16, 1872.

SPECIFICATION.

*To all whom it may concern:*

Be it known that I, Z. LOCKWOOD, of Saratoga Springs, in the county of Saratoga and State of New York, have invented certain Improvements in Sash-Fasteners, of which the following is a specification, reference being had to the accompanying drawing.

My invention relates to devices for supporting and locking down window-sash; and consists in a spring dog or catch of novel construction, to be mounted within the window-frame, as hereinafter described.

Figure 1 is a perspective view of my dog or fastening, and Fig. 2 is a vertical section through a window-frame and sash having my fastening applied thereto.

In constructing a fastening on my plan I provide a dog, A, of the form shown in Fig. 1, consisting of a stem, $a$, having at its lower end an arm, $b$, and at its upper end two arms, $c$ and $d$, standing at right angles to each other and to the stem $a$, as shown. The arm $c$ I make wider than the stem $a$, and the arm $d$ I provide with a thumb-piece or knob, $e$, as shown in both figures. I then apply to the dog a spring-arm, $f$, by taking a piece of spring-wire and winding it at its middle around arm $b$, and then inserting its end through a hole made for the purpose in stem $a$, as shown, so as to hold it in position. Having thus provided the dog or fastening, I cut a recess into the window-frame opposite the side or edge of the sash and place the dog therein, and secure its lower arm $b$ by driving a small staple, $g$, over it, as shown in Fig. 2. When thus applied, the spring $f$ forces the upper end of the dog outward, so that its arm $c$ will lock into notches $h$ cut in the edge of the sash, and thereby hold the sash in place. The arm $d$ extends out through the guiding-strip $i$ of the sash, so as to expose the thumb-piece $e$, as shown. By pressing on the thumb-piece the arm $c$ of the dog is thrown out of the notch in the sash, so that the latter may be raised or lowered, as required, and then locked by releasing the thumb-piece, so as to let the arm $c$ fall into another notch. To prevent the dog from falling over downward when the sash is removed from the window, I drive over the stem $a$ a staple, $k$, of such length as to admit only the requisite movement of the stem. The dog may be formed by bending a single piece of wire into shape, as shown, or it may be cast or forged if preferred.

The fastening constructed as described is exceedingly simple, cheap, and strong, is readily applied, and, being concealed from sight except the knob, it does not disfigure the window.

I am aware that wire-spring catches of various forms have been for use on windows, and I do not claim such when the catch and spring are all made of one piece; but What I do claim is—

The rigid catch, consisting of a piece of wire bent in the form shown, with its bottom resting on the bottom of the recess and passing loosely through the staples $g$ and $k$, and having the spring $f$ applied thereto, the whole constructed and arranged to operate as set forth.

ZEPHANIAH LOCKWOOD.

Witnesses:
P. F. ALLEN,
JOHN FOLEY.